Sept. 24, 1940.    C. E. WHITE    2,215,571
HILLSIDE REGULATOR FOR TRACTORS
Filed April 17, 1939    3 Sheets-Sheet 1
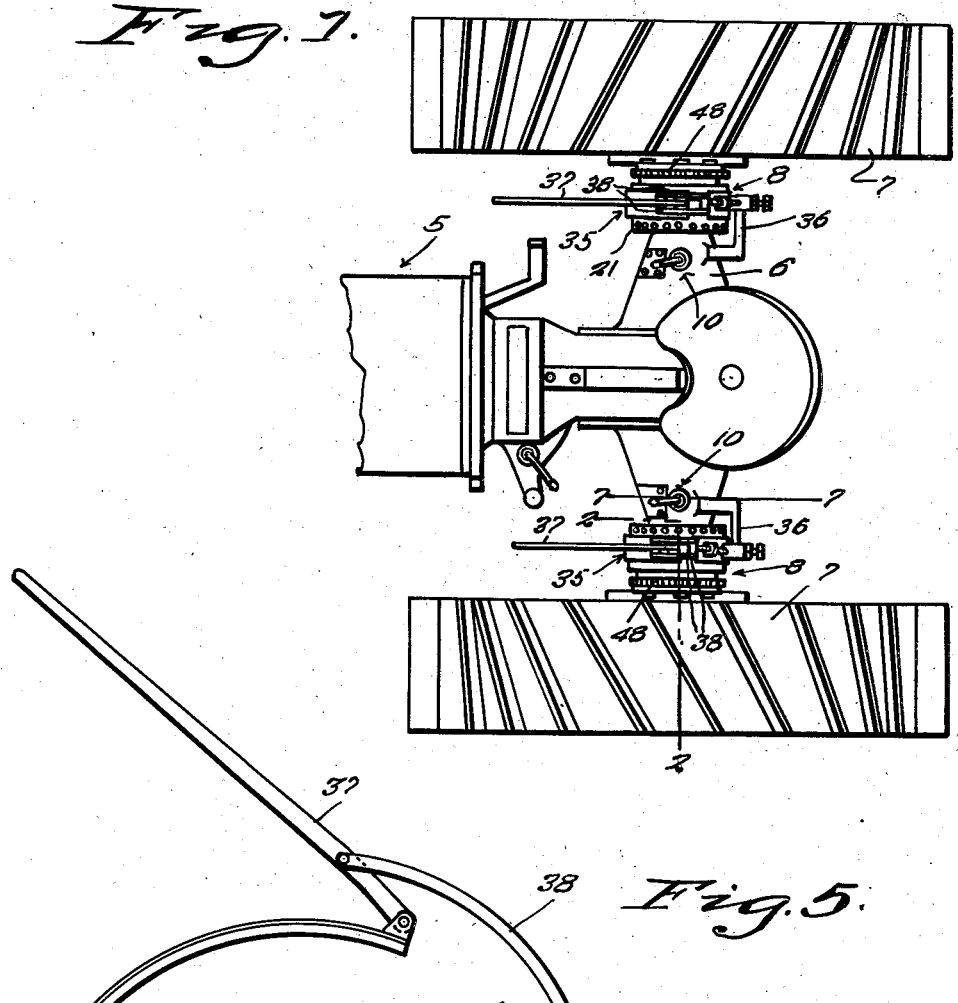
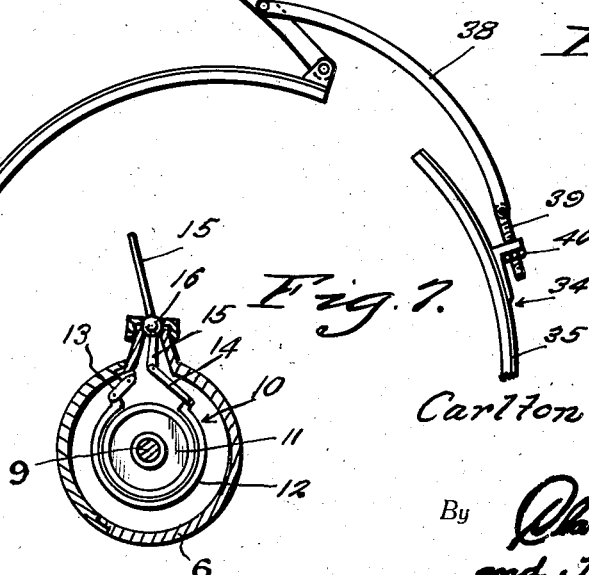
Inventor
Carlton E. White
By Clarence A. O'Brien
and Hyman Berman
Attorneys

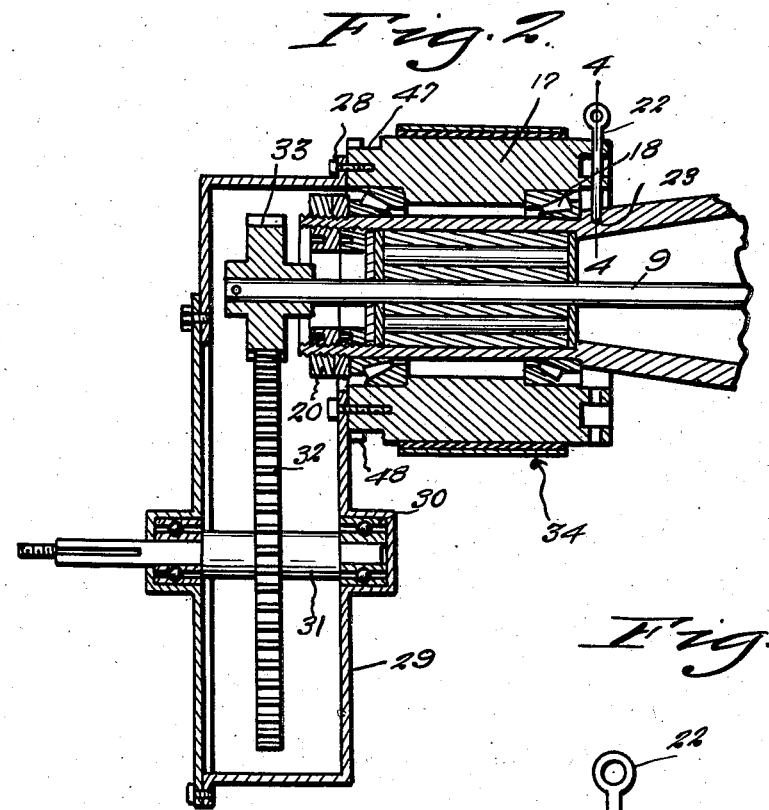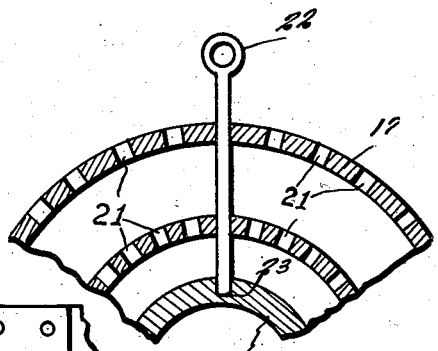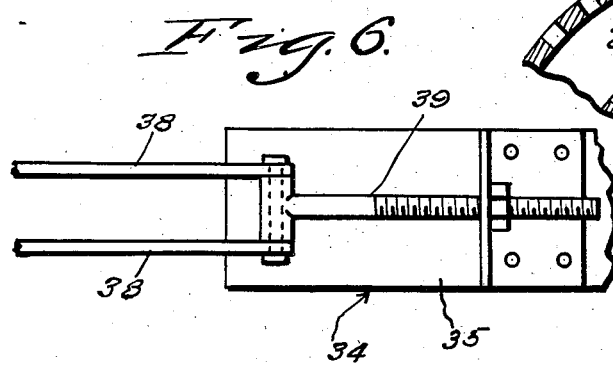

Sept. 24, 1940.  C. E. WHITE  2,215,571
HILLSIDE REGULATOR FOR TRACTORS
Filed April 17, 1939   3 Sheets-Sheet 3
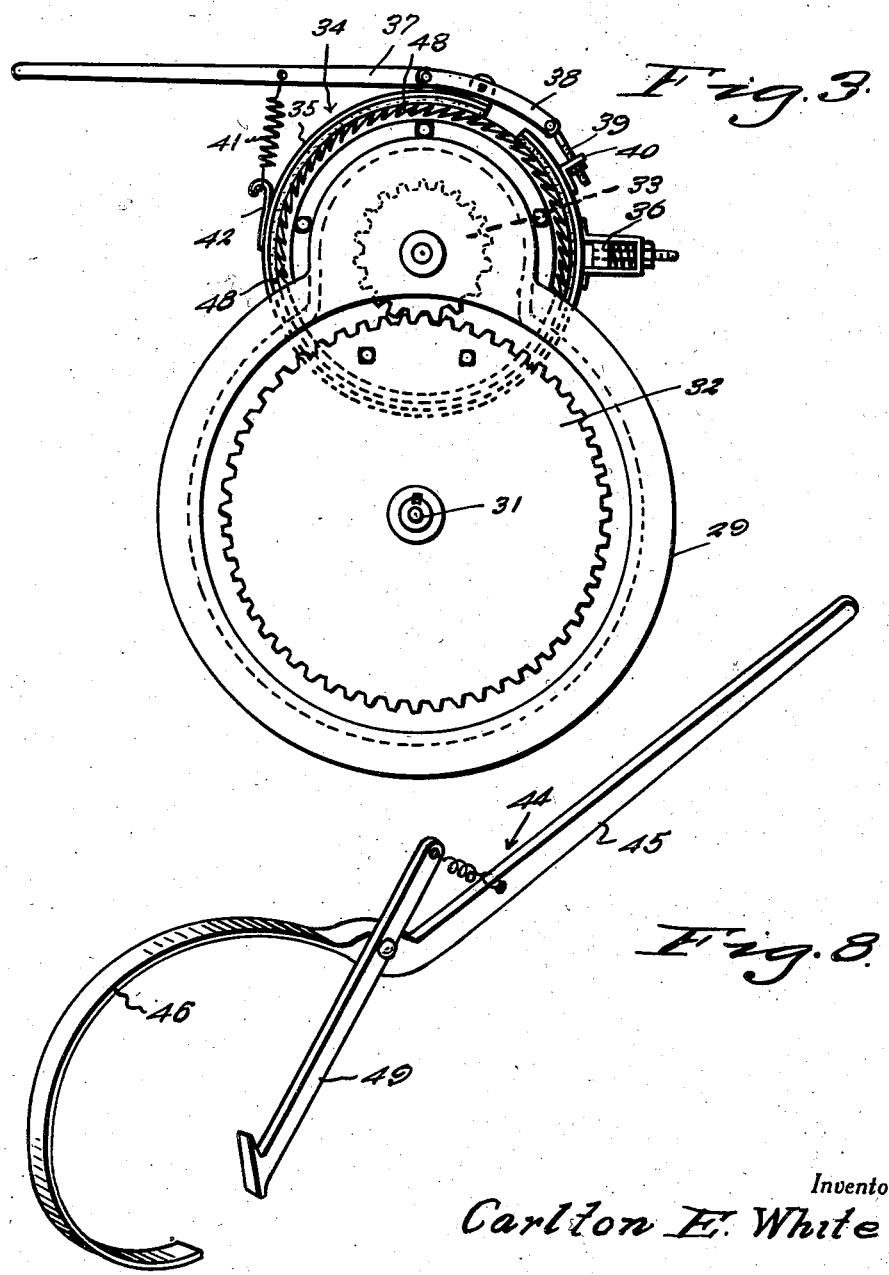
Inventor
Carlton E. White
By Clarence A. O'Brien
and Hyman Berman
Attorneys Patented Sept. 24, 1940

2,215,571

UNITED STATES PATENT OFFICE 2,215,571

HILLSIDE REGULATOR FOR TRACTORS

Carlton E. White, Verbena, Ala.

Application August 17, 1939, Serial No. 290,685

1 Claim. (Cl. 180—41)

This invention relates to hillside regulators for tractors and similar motor vehicles, and has for the primary object the provision of a device of this character which may be actuated either manually or by power derived from the tractor to adjust either of the tractor wheels when desired for the supporting of said tractor substantially horizontally when operating on a hillside or a slope, so that the maximum amount of tractor performance may be had under these conditions.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a fragmentary top plan view illustrating a portion of a tractor equipped with wheel regulators constructed in accordance with my invention.

Figure 2 is a sectional view taken on the line 2—2 of Figure 1.

Figure 3 is an end view illustrating one of the regulators.

Figure 4 is a detail sectional view taken on the line 4—4 of Figure 2.

Figure 5 is a fragmentary perspective view illustrating a brake for the regulator.

Figure 6 is a fragmentary plan view illustrating a portion of the brake.

Figure 7 is a detail sectional view taken on the line 7—7 of Figure 1.

Figure 8 is a perspective view illustrating a manually operated tool for adjusting the regulator.

Referring in detail to the drawings, the numeral 5 indicates a fragmentary portion of a tractor, the rear axle housing being indicated by the character 6 and the traction wheels by the character 7. The purpose of the present invention is to permit adjustment of the traction wheels vertically with respect to the axle housing 6 independently of each other so that the tractor may operate on a hillside with the tractor remaining substantially horizontally. The regulators are indicated by the character 8 and as will be seen from Figure 1 are located on the rear axle housing 6 adjacent the traction wheels 7.

It is to be understood that regulators 8 also may be provided for the front wheels of the tractor if desired. However, when a tractor employs a single front wheel it is not believed necessary to employ a regulator for such a wheel.

The power axles of the tractor are indicated by the character 9 and are shown as being journaled within the rear axle housing 6 which also includes therein the usual differential for the power axles. For the successful operation of the regulators by power derived from the tractor brakes 10 must be provided for the axles 9 whereby either one of said axles may be locked against rotation when it is desired to adjust one or the other of the regulators. Each brake consists of a drum 11 secured on its respective power axle and is engaged by a split type brake band 12, one end of which is mounted on the axle housing by a pivotal link connection 13 while the opposite end of the brake band 12 is pivotally connected to a link 14. The link 14 has pivotal connection with an operating lever 15 pivotally mounted on the axle housing, as shown at 16. A movement of the lever 15 in one direction will bring about contraction of the brake band of the drum 11 and consequently secure the power axle against rotation to which the drum is fastened.

The regulators 8 each consists of a cylinder 17 journaled on the axle housing adjacent an end thereof and it is preferable that anti-friction bearings 18 be arranged between the cylinder and the axle housing. Nuts 20 are threaded on the axle housing for retaining the cylinder 17 on the axle housing for rotation and which will, of course, permit easy removal of the cylinder should it be necessary for any purpose such as inspecting or making repairs to the bearings 18. The cylinder 17 at one end is provided with a series of openings 21 to receive a lock pin 22 adapted to enter pockets 23 provided in the axle housing for securing the cylinder against rotation on the axle housing. It is to be understood that the pin 22 can be easily removed when desiring to rotate the cylinder on the axle housing for bringing about leveling of the tractor.

Secured to one end of the cylinder 17 by stud bolts 28 is an elongated casing 29 equipped with bearings 30 for the support of a traction wheel axle 31. It is to be seen by reference to Figure 2 that the axle 31 is located eccentrically of the power axle 9. Meshing gears 32 and 33 connect the power axle and the traction axle together, the gear 33 being secured to the power axle while the gear 32 is secured on the traction axle and the latter is constructed to have the traction wheel keyed thereon.

A brake mechanism 34 is associated with the cylinder 17 for securing said cylinder against rotation when the pin 22 has been removed and may be manually operated to permit the cylinder 17 to rotate about the axle housing 6 as much as desired. The brake mechanism 34 includes a split brake band 35 surrounding the cylinder and supported by a bracket 36 carried by the axle housing. One end of the brake band 35 is pivoted to an operating lever 37 and pivoted to said lever is a link construction 38 carrying a T-bolt 39 adjustably connected to the brake band adjacent the other end thereof, as shown at 40. The link construction 38 has an arcuate curvature so that when said lever 37 assumes a certain position the pivot of the link construction on said lever 37 will pass a dead center position for holding the brake band 35 contracted on the cylinder 17. For retaining the brake lever 37 in the latter-named position or in brake-applying position a coil spring 41 may be attached thereto and to a hook 42 secured on the brake band. To expand or release the gripping action of the brake band 35 on the cylinder the hand lever 37 is swung in an opposite direction against the action of the spring 41 and manually held.

To level the tractor for use on a hillside one of the regulators 8 is employed, that is, the regulator at the low side of the tractor while the power axle 9 on the opposite side of the tractor is secured against rotation by its respective brake mechanism 10. The pin 22 of the regulator to be used is removed and the cylinder of said regulator is released by actuating its respective brake. Power is then delivered to the power axles of the tractor in the usual way from the engine of the tractor and as one of the power axles is held against rotation the other power axle rotates and the gear 33 thereof walks about the gear 32 bringing about raising or lowering of one side of the tractor depending on which direction the gear 33 walks about the gear 32. After the tractor has been brought to a selected level upon a slope, the brake mechanism is permitted to engage the cylinder 17 of the regulator in operation holding said regulator against further adjustment. The pin 22 may then be positioned in a socket of the axle housing locking the regulator against further adjustment.

Should it be desired to operate the regulator manually a tool 44 is provided which consists of a level 45 having integral with one end thereof an arcuately curved element 46 adapted to fit within a groove 47 of the cylinder 17 and the latter is provided at one end thereof with a series of ratchet teeth 48 to be engaged by a spring-influenced dog 49 pivoted on the lever 45. By operating the lever 45 in opposite directions with the member 46 journaling on the drum and the dog 49 operating in conjunction with the ratchet teeth will bring about rotation of the drum to adjust the level of the tractor through the use of said regulator.

It is understood that when the regulator is operated manually through the use of the device 44 the drum 17 of said regulator is released for rotation in the manner heretofore described.

It is believed that the foregoing description, when taken in connection with the drawings, will fully set forth the construction and advantages of this invention to those skilled in the art to which such a device relates, so that further detailed description will not be required.

What I claim is:

A regulator for tractors comprising a cylinder journaled on a rear axle housing of a tractor and including anti-friction bearings located between said cylinder and the housing, a casing secured to one end of the cylinder and extending at right angles thereto, said casing receiving a power axle of the rear axle housing, a brake means carried by said housing to act on the power axle, bearings located eccentrically of the power axle in the casing for the support of a traction wheel axle, gearing between said axles, a hand brake for said cylinder, a pin adjustably mounted in said cylinder to engage with notches of the rear axle housing for locking the cylinder against rotation, said cylinder having a groove, ratchet teeth on the cylinder to be engaged by a hand tool with a portion of the latter entering said groove.

CARLTON E. WHITE.